US007817566B2

(12) United States Patent
Lee et al.

(10) Patent No.: US 7,817,566 B2
(45) Date of Patent: Oct. 19, 2010

(54) WIRED MIMO LINK TESTER

(75) Inventors: Sung-Jun Lee, Dajon (KR); Jae-Ho Jung, Daejon (KR); Hyeong-Geun Park, Daejon (KR); Seong-Min Kim, Daejon (KR); Kwang-Chun Lee, Daejon (KR)

(73) Assignees: Electronics and Telecommunications Research Institute, Daejeon (KR); Samsung Electronics Co., Ltd., Gyeonggi-do (KR)

( * ) Notice: Subject to any disclaimer, the term of this patent is extended or adjusted under 35 U.S.C. 154(b) by 234 days.

(21) Appl. No.: 11/951,587

(22) Filed: Dec. 6, 2007

(65) Prior Publication Data
US 2008/0151763 A1 Jun. 26, 2008

(30) Foreign Application Priority Data
Dec. 8, 2006 (KR) ............... 10-2006-0124832
Nov. 26, 2007 (KR) ............... 10-2007-0120715

(51) Int. Cl.
*G01R 31/08* (2006.01)
(52) U.S. Cl. ..................................... 370/248; 370/252
(58) Field of Classification Search ................ 370/241, 370/242, 243, 244, 245, 248, 252
See application file for complete search history.

(56) References Cited
U.S. PATENT DOCUMENTS
7,154,959 B2 * 12/2006 Erceg et al. ................ 375/267

| 7,349,670 | B2* | 3/2008 | Mlinarsky et al. | 455/67.11 |
|---|---|---|---|---|
| 7,412,373 | B2* | 8/2008 | Liu | 703/27 |
| 2003/0050020 | A1 | 3/2003 | Erceg et al. | |
| 2007/0243826 | A1* | 10/2007 | Liu | 455/67.11 |
| 2008/0084951 | A1* | 4/2008 | Chen et al. | 375/347 |
| 2008/0114580 | A1* | 5/2008 | Chin et al. | 703/13 |
| 2008/0123756 | A1* | 5/2008 | Daniels et al. | 375/260 |

FOREIGN PATENT DOCUMENTS
KR 1020010048715 A 6/2001
KR 102060051670 5/2006

OTHER PUBLICATIONS
John F. Mastrangelo, et al.; "A New Wideband High Frequency Channel Simulation System;" IEEE Transactions Communications, vol. 45, No. 1, pp. 26-34, Jan. 1997.

* cited by examiner

*Primary Examiner*—Ricky Ngo
*Assistant Examiner*—Christine Ng
(74) *Attorney, Agent, or Firm*—Ladas & Parry LLP

(57) ABSTRACT

Provided is a wired Multiple-Input Multiple-Output (MIMO) link tester. The wired link tester, includes: a simulating unit for constructing a wired link corresponding to a wireless link for a multiple-input multiple-output system and simulating wireless-link characteristics using each variable element located on the wired link; and a control means for prestoring a predetermined value of the variable element depending on the state change time and the number of the state changes and controlling the variable element according to the predetermined value of the variable element.

6 Claims, 9 Drawing Sheets

FIG. 4

| Downlink attenuation | | MIN(dB) | MAX(dB) |
|---|---|---|---|
| Base station | | 20 | |
| Fixed path loss simulator | | 30 | |
| Variable path loss simulator | | 0 | 60 |
| Fast fading simulating unit | 4-way combiner/divider | 6 | |
| | 2-way combiner/divider | 6 | |
| Uplink/downlink path loss compensator | 2-way combiner/divider | 3 | |
| | Attenuator | | |
| Insertion loss, cable/connector loss | | 24 | |
| for compensation of deviation for each wired link | | | |
| Total | | 89 | 149 |

| Uplink attenuation | | MIN(dB) | MAX(dB) |
|---|---|---|---|
| Base station | | | |
| Fixed path loss simulator | | 30 | |
| Variable path loss simulator | | 0 | 60 |
| Fast fading simulating unit | 4-way combiner/divider | 6 | |
| | 2-way combiner/divider | 6 | |
| Uplink/downlink path loss compensator | 2-way combiner/divider | 3 | |
| | Attenuator | 20 | |
| Insertion loss, cable/connector loss | | 24 | |
| for compensation of deviation for each wired link | | | |
| Total | | 89 | 149 |

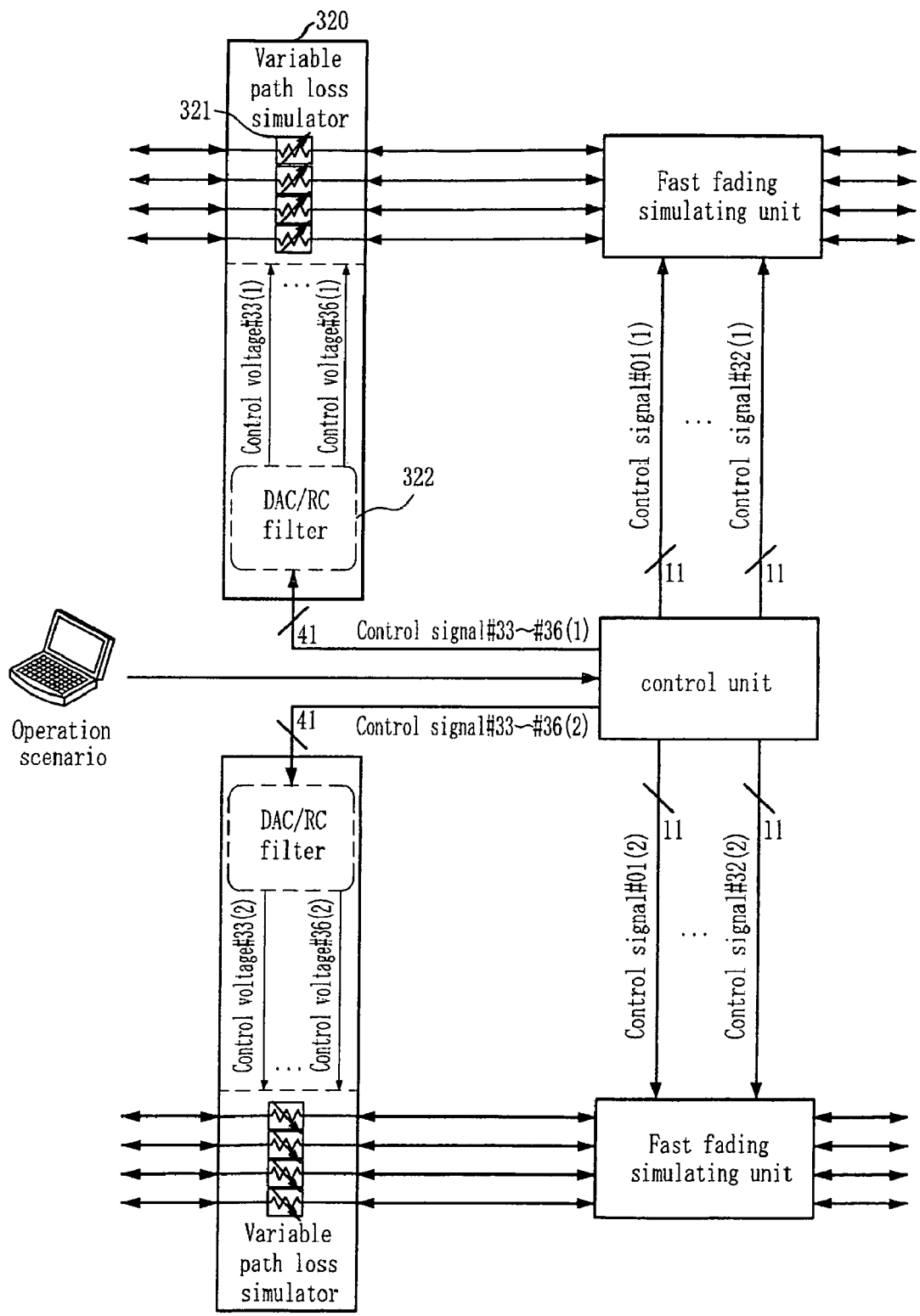

WIRED MIMO LINK TESTER

CROSS-REFERENCE(S) TO RELATED APPLICATIONS

The present invention claims priority of Korean Patent Application Nos. 10-2006-0124832 and 10-2007-0120715, filed on Dec. 8, 2006 and Nov. 26, 2007, respectively, which are incorporated herein by reference.

BACKGROUND OF THE INVENTION

1. Field of the Invention

The present invention relates to a wired Multiple-Input Multiple-Output (MIMO) link tester; and, more particularly, to a wired link tester, which can check the performance of an MIMO system indoors prior to an outdoor experiment by simulating wireless-channel environments of the MIMO system using a wired link.

This work was supported by the IT R&D program for MIC/IITA [2005-S-404-12, "Research & Development of Radio Transmission Technology for 3G evolution"]

2. Description of Related Art

For development of the communication system, the system is checked by performing an indoor wired test prior to an outdoor wireless test.

Thus, in case of the next-generation communication system supporting high-speed multimedia communication using wide bandwidth and multiple antennas, a scheme for the indoor wired test must be considered that can perform the above operation on a Multiple-Input Multiple-Output (MIMO) system.

In case of the conventional single-antenna system, a transmitting antenna port and a receiving antenna port are connected in a wired fashion, thereby testing the corresponding system under the wireless-channel environment that is most ideal in terms of a modem. In this case, only the operation or not of the system can be detected.

However, in case of the MIMO system, feasibility of the above scheme depends on the formation of transmitting antennas and receiving antennas.

Even when the above wired test scheme can be used, if the number of transmitting antennas is identical to the number of receiving antennas, only the operation or not of the system is detected as in the single-antenna system test. This is however a test under the very-unreasonable condition where a signal transmitted from one transmitting antenna is received only at one receiving antenna.

Also, in case of the conventional single-antenna system, the system can be tested in a wired fashion using a channel simulator that is capable of simulating a general wireless channel.

The channel simulator down-converts a signal received from a transmitting system, simulates the influence of a wireless channel by baseband digital signal processing, and up-converts the resulting signal prior to transmission to a receiving system. The system test using the channel simulator can be a system test under every condition. However, the channel simulator for the system test requires a complex structure and high costs.

Particularly, in case of the MIMO system, the channel simulator for the system test requires more complex structure and higher costs.

SUMMARY OF THE INVENTION

An embodiment of the present invention is directed to providing a scheme for overcoming limitations of a conventional method.

Another embodiment of the present invention is directed to providing a wired link tester that has functions of testing a simple system operation, a system automatic gain control function, and a system handover function while being more advantageous than the channel simulator in terms of implementation or cost.

Another embodiment of the present invention is directed to providing an apparatus for a Radio Frequency (RF) wired Multiple-Input Multiple-Output (MIMO) link tester, which can check the performance of an MIMO system indoors prior to an outdoor experiment by simulating the wireless-channel environments of the MIMO system using a wired link.

In accordance with an aspect of the present invention, there is provided a wired link tester, including: a simulating unit for constructing a wired link corresponding to a wireless link for a multiple-input multiple-output system and simulating wireless-link characteristics using each variable element located on the wired link; and a control means for prestoring a predetermined value of the variable element depending on the state change time and the number of the state changes and controlling the variable element according to the predetermined value of the variable element.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

BRIEF DESCRIPTION OF THE DRAWINGS

FIG. 4 is a diagram illustrating a power budget of the fast fading simulating unit and the path loss simulating unit in accordance with an embodiment of the present invention.

FIG. 6B is a diagram illustrating control signals of the control unit of FIG. 6A and the connection among the control unit, the fast fading simulating unit and the path loss simulating unit.

DESCRIPTION OF SPECIFIC EMBODIMENTS

The advantages, features and aspects of the invention will become apparent from the following description of the embodiments with reference to the accompanying drawings, which is set forth hereinafter. Therefore, those skilled in the field of this art of the present invention can embody the technological concept and scope of the invention easily. In addition, if it is considered that detailed description on a related art may obscure the points of the present invention, the detailed description will not be provided herein. The preferred embodiments of the present invention will be described in detail hereinafter with reference to the attached drawings.

Figure 1:
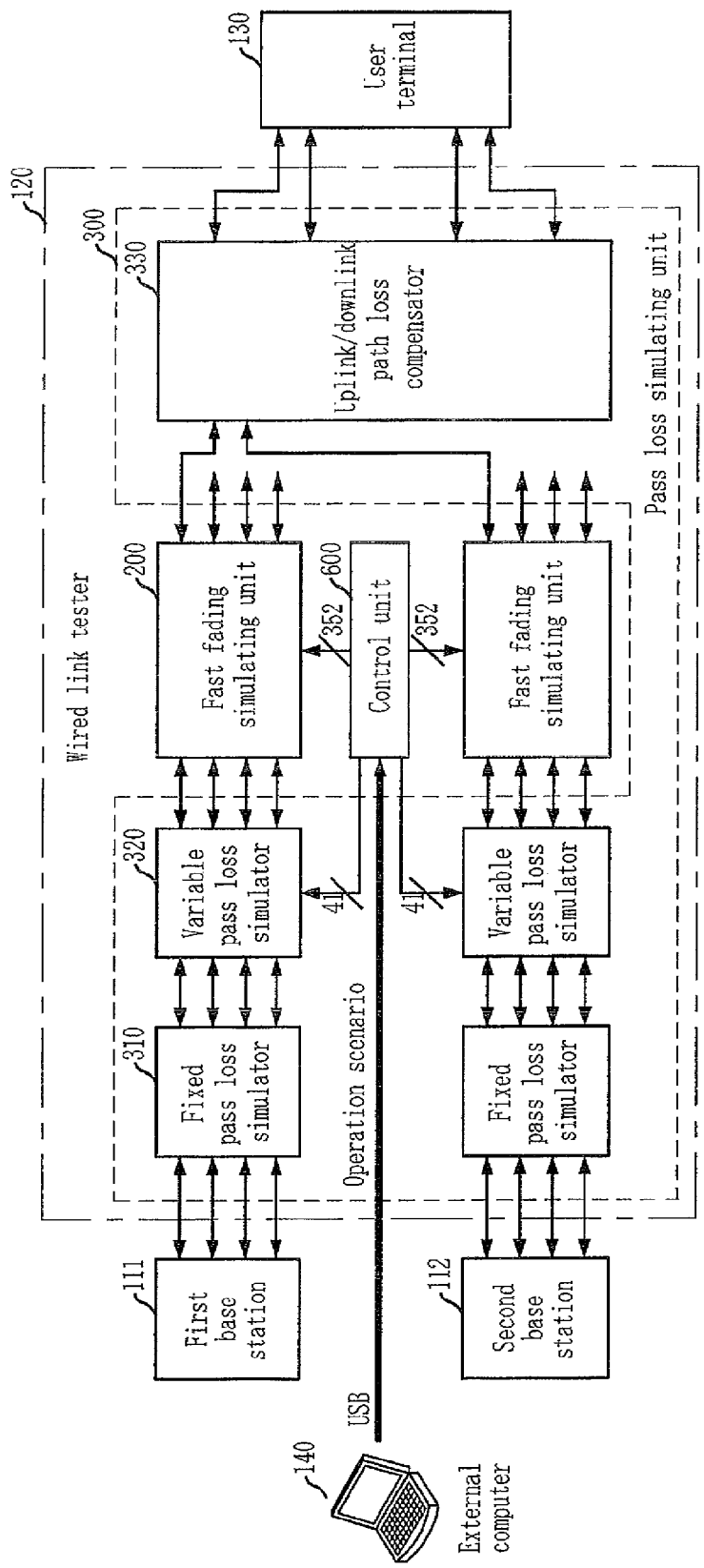
FIG. 1 is a block diagram showing a Radio Frequency (RF) wired Multiple-Input Multiple-Output (MIMO) link tester in accordance with an embodiment of the present invention.

FIG. 1 is a block diagram showing a Radio-Frequency (RF) wired Multiple-Input Multiple-Output (MIMO) link tester in accordance with an embodiment of the present invention. Hereinafter, the apparatus for the RF wired MIMO link tester will be referred to as 'wired link tester'.

Referring to FIG. 1, a wired link tester 120 connects a first base station 111, a second base station 112, a user terminal 130, and an external computer 140 to establish a test environment.

Based on the fact that a wireless channel is actually a phase shift and attenuation applied to an RF signal, unlike the conventional channel simulator, the present invention simulates a wireless channel by applying a direct attenuation and a phase shift to an RF signal of an MIMO system to be tested.

Because it is difficult to implement a time delay in an RF band with respect to a multipath, the present invention does not construct a wired link corresponding to the multipath. Thus, the wired link tester in accordance with the present invention cannot simulate a wireless channel with frequency selectivity.

The wired link tester 120 includes a fast fading simulating unit 200, a path loss simulating unit 300, and a control unit 600.

The fast fading simulating unit 200 allows the wired link tester 120 constructs 16 wired links corresponding to 16 wireless links for a 4×4 MIMO system, thereby simulating a situation where an RE signal transmitted from one transmitting antenna is received at all the receiving antennas.

Also, the fast fading simulating unit 200 simulates fast-fading characteristics by changing the characteristics of a variable attenuator and a variable phase shifter according to a control signal from the control unit 600.

The path loss simulating unit 300 creates 16 wired links in association with the fast fading simulating unit 200. The path loss simulating unit 300 simulates path-loss characteristics by changing the characteristics of a variable attenuator in the path loss simulating unit 300 according to a control signal from the control unit 600.

The control unit 600 prestores values for simulating wireless-link characteristics, i.e., attenuation characteristics and phase characteristics, and controls the fast fading simulating unit 200 and the path loss simulating unit 300 accordingly. At this point, the values stored in the control unit 600 to simulate the wireless-link characteristics are provided from the external computer 140.

For convenience of description, FIG. 1 illustrates an exemplary case where the wired link tester 120 constructs 4×4 (=16) wired links to test the performance of the 4×4 MIMO system. However, the present invention is not limited to this.

The base stations 111 and 112 and the user terminal 130 mean an MIMO system that is tested.

The external computer 140 determines the characteristics of a wireless link that is to be simulated by the wired link tester 120. Also, the external computer 140 generates control values of the variable elements, which the wired link tester 120 uses to simulate the wireless-link characteristics.

Figure 2:
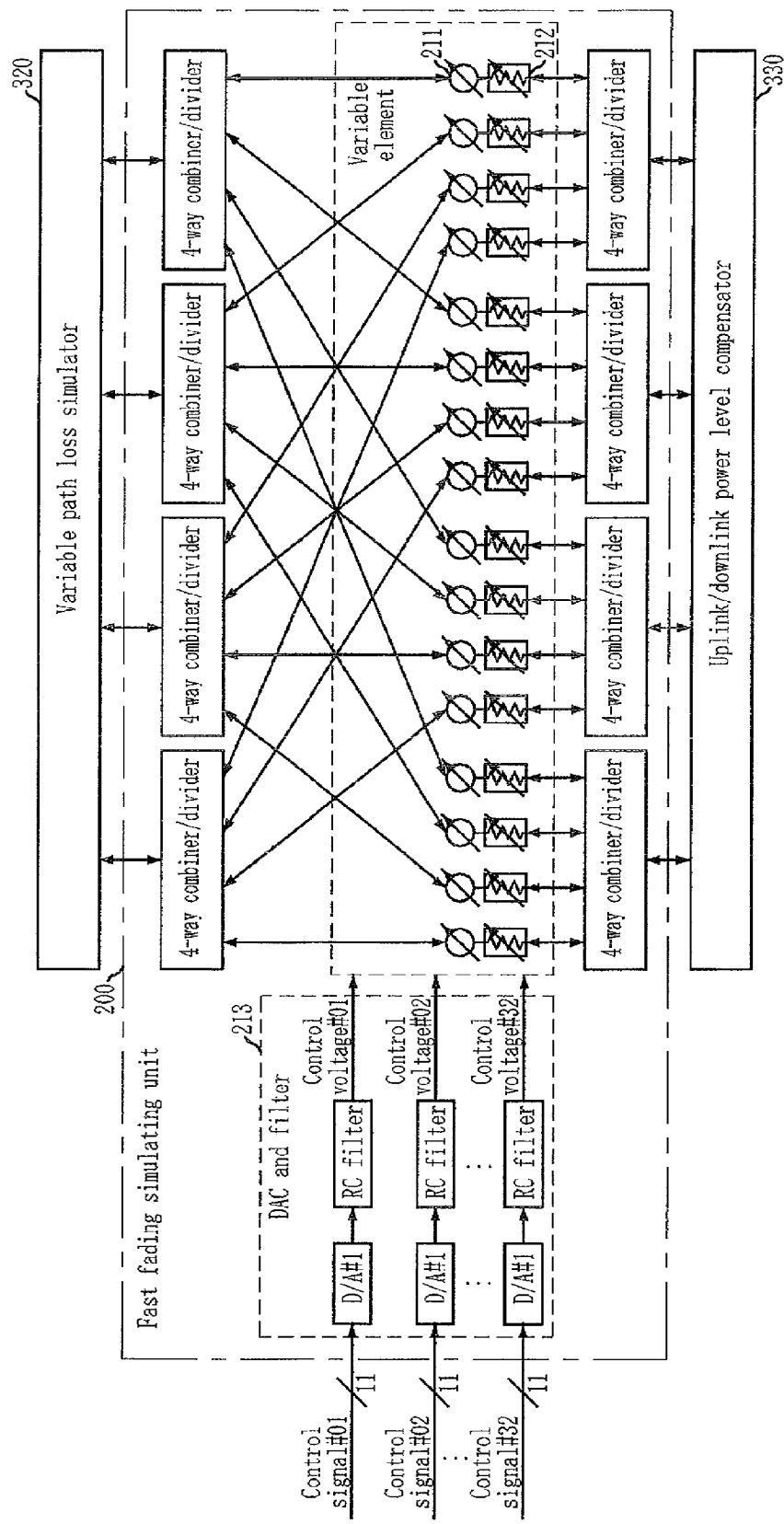
FIG. 2 is a block diagram of a fast fading simulating unit in accordance with an embodiment of the present invention.

FIG. 2 is a block diagram of the fast fading simulating unit 200 in accordance with an embodiment of the present invention.

Referring to FIG. 2, using a 4-way combiner/divider, the fast fading simulating unit 200 simulates a situation where an RF signal is transmitted from one transmitting antenna to all the receiving antennas. That is, the fast fading simulating unit 200 allows the wired link tester 120 to create 16 wired links corresponding to 16 wireless links for an up to 4×4 MIMO system.

Also, the fast fading simulating unit 200 simulates fast-fading characteristics by changing the characteristics of a variable phase shifter 211 and a variable attenuator 212, which are included in the fast fading simulating unit 200, according to a control signal from the control unit 600. To this end, the fast fading simulating unit 200 includes a Digital-to-Analog Converter (DAC)/RC filter 213 that is connected to each of the variable elements to convert a digital control signal of the control unit 600 into an analog control voltage for control of the variable elements, i.e., the variable phase shifter 211 and the variable attenuator 212.

Figure 3:
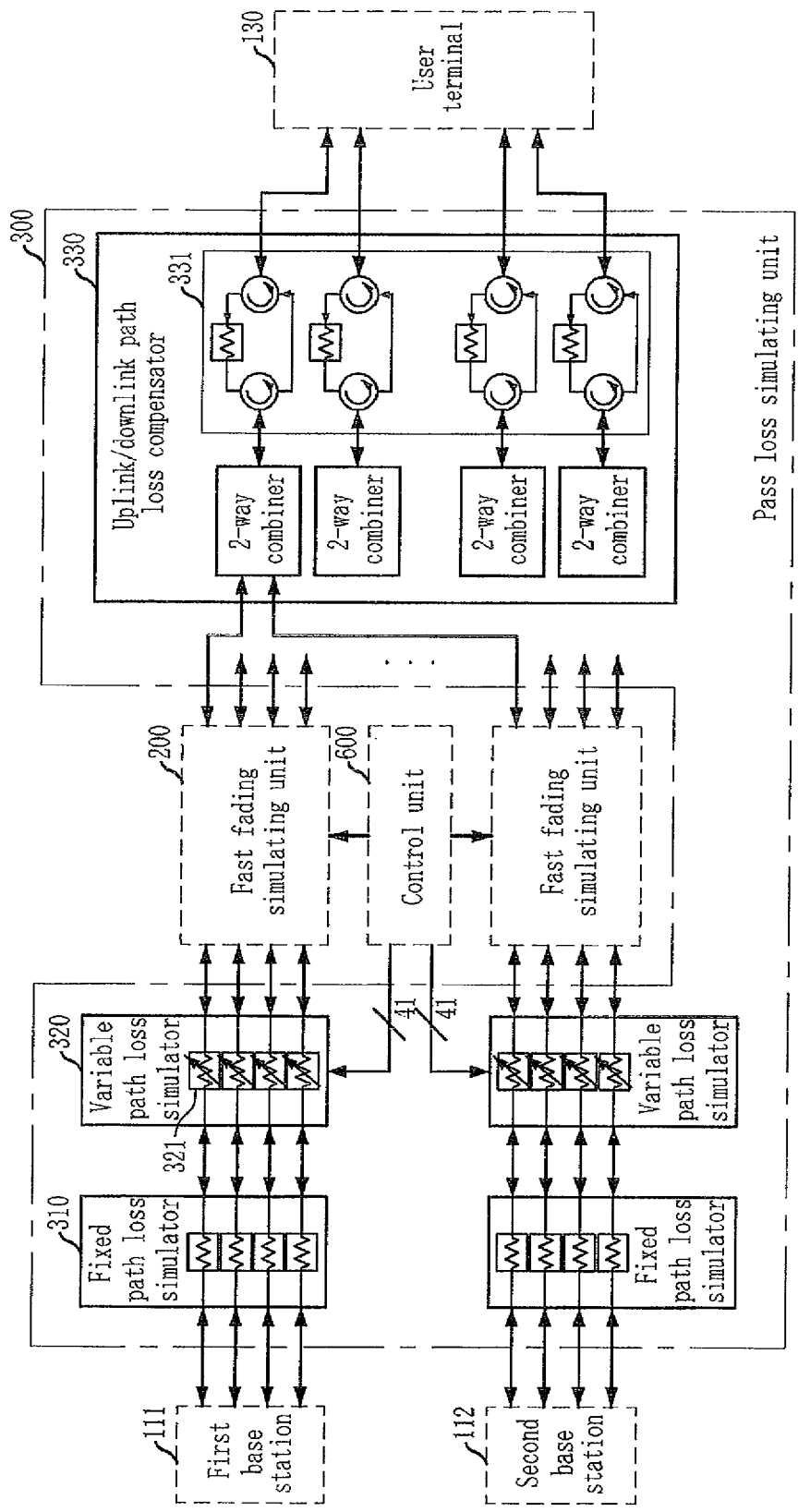
FIG. 3 is a block diagram of a path loss simulating unit in accordance with an embodiment of the present invention.

FIG. 3 is a block diagram of the path loss simulating unit 300 in accordance with an embodiment of the present invention.

Referring to FIG. 3, the path loss simulating unit 300 includes a fixed path loss simulator 310, a variable path loss simulator 320, and an uplink/downlink path loss compensator 330. The attenuation value of the path loss simulating unit 300 is related to the path loss simulated by the tester.

The fixed path loss simulator 310 reduces the level of a signal distortion caused by the inter-modulation distortion of active elements, i.e., a variable attenuator 321 of the variable path loss simulator 320 in the path loss simulating unit 300 and the variable phase shifter 211 and the variable attenuator 212 of the fast fading simulating unit 200. That is, the fixed path loss simulator 310 reduces the power level of an RF signal input into the active element, thereby reducing the level of a signal distortion caused by the inter-modulation distortion of the wired link tester 120.

The variable path loss simulator 320 changes the attenuation value of the path loss simulating unit 300 by changing the characteristics of the variable attenuator 321 according to a control signal from the control unit 600.

Although not illustrated in FIG. 3, the variable path loss simulator 320 includes a DAC/RC filter (see a reference numeral 322 of FIG. 6B) that is connected to each of the variable elements to convert a digital control signal of the control unit 600 into an analog control voltage for control of the variable element, i.e., the variable attenuator 321.

Using a circulator/fixed attenuator structure 331, the uplink/downlink path loss compensator 330 compensates an uplink (UL), thereby applying the same attenuation to the uplink (UL) and a downlink (DL).

As illustrated in FIG. 4, it is assumed that the base station attenuates its own transmitting power in order to reduce a signal distortion caused by the inter-modulation distortion of the wired link tester 120. Because the attenuation in the base station is applied only to the downlink not to the uplink, the uplink/downlink path loss compensator 330 compensates the attenuation such that the attenuation of the uplink is identical to the attenuation of the downlink.

Also, the uplink/downlink path loss compensator 330 operates such that signals are transmitted from the two base stations, i.e., the first base station 111 and the second base station 112, to the user terminal 130 and signals are transmitted from the user terminal 130 to the two base stations, i.e., the first base station 111 and the second base station 112. Thus, the wired link tester 120 can perform a handover test when it simulates a path loss between the first base station 111 and the user terminal 130 and a path loss between the second base station 111 and the user terminal 130, as illustrated in FIG. 7B.

Figure 5:
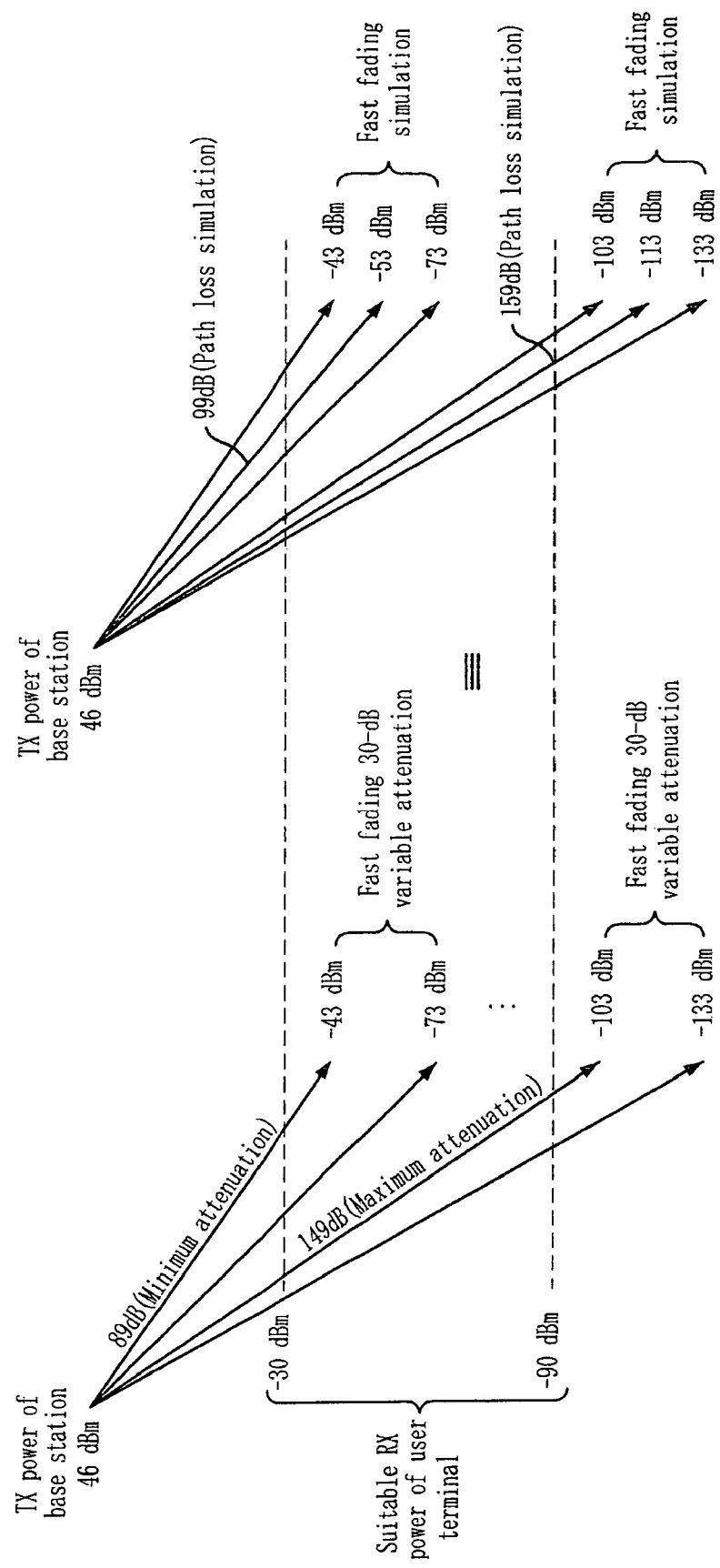
FIG. 5 is a diagram illustrating meaning of the power budget illustrated in FIG. 4.

FIG. 4 is a diagram illustrating the power budget of the fast fading simulating unit 200 and the path loss simulating unit 300 in accordance with an embodiment of the present invention. FIG. 5 is a diagram illustrating the meaning of the power budget illustrated in FIG. 4.

As illustrated in FIG. 4, it is assumed that the variable attenuator 212 of the fast fading simulating unit 200 has a variable range of 30 dB and the variable attenuator 321 of the path loss simulating unit 300 has a variable range of 60 dB. Also, it is assumed that the variable phase shifter 211 of the fast fading simulating unit 200 has a variable range of 360°.

As illustrated in FIG. 5, it is assumed that the transmitting power level of the base station is 46 dBm and the suitable receiving power level of the user terminal is between −90 dBm and −30 dBm.

The minimum attenuation value '89 dB' of the wired link tester 120 is related to the minimum path loss simulated by the wired link tester 120. Based on this, the control unit 600 simulates path-loss characteristics by changing the attenuation characteristics of the variable path loss simulator 320 of the path loss simulating unit 300 within the range of 60 dB.

Also, the control unit 600 simulates fast-fading characteristics by changing the attenuation and phase characteristics of the fast fading simulating unit 200 within the ranges of 30 dB and 360°, respectively.

Figure 6A:
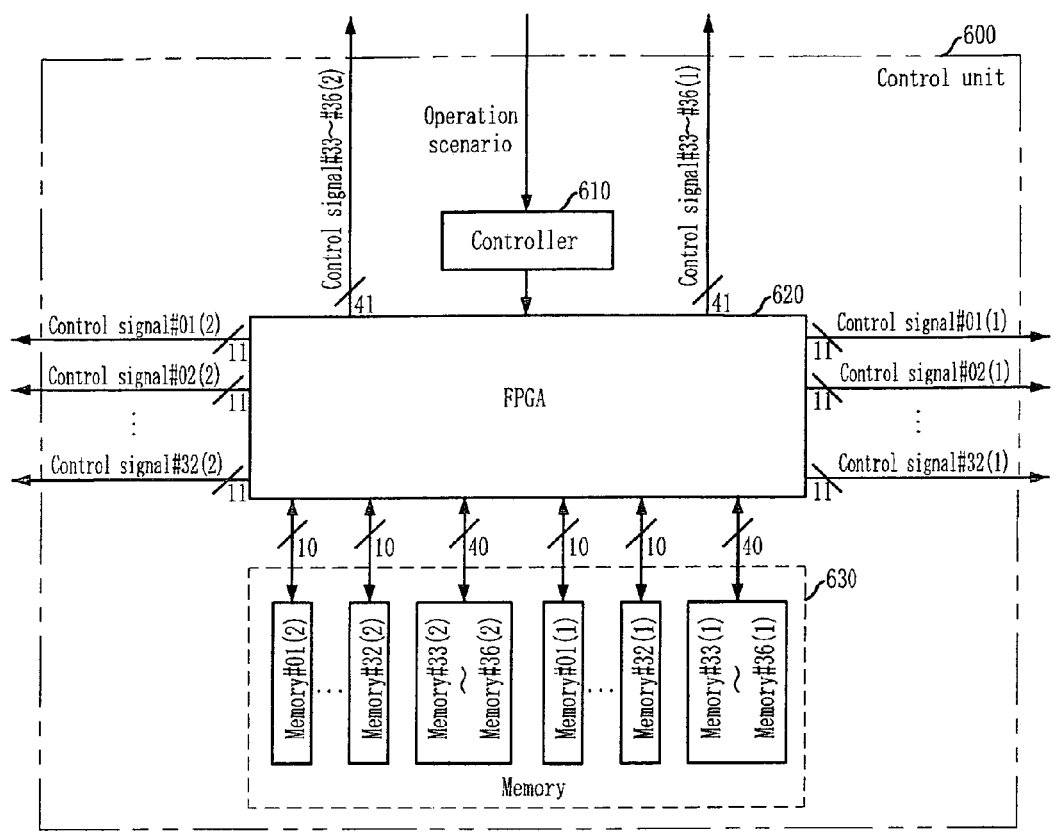
FIG. 6A is a block diagram of a control unit in accordance with an embodiment of the present invention.

FIG. 6A is a block diagram of the control unit 600 in accordance with an embodiment of the present invention. FIG. 6B is a diagram illustrating control signals of the control unit of FIG. 6A and the connection among the control unit 600, the fast fading simulating unit 200 and the path loss simulating unit 300.

Referring to FIG. 6A, the control unit 600 includes a controller 610, a field programmable gate array (FPGA) 620, and a memory 630.

A channel scenario and an operation scenario will be first described prior to describing the respective components of the control unit 600.

The channel scenario is generated by the external computer 140, and means the characteristics of a wireless channel that is to be simulated. That is, the channel scenario means the attenuation and phase characteristics versus time that are simulated by the fast fading simulating unit 200 and the path loss simulating unit 300.

The operation scenario means the actual DAC values of the respective variable elements, which are used to represent the attenuation and phase characteristics of the channel scenario that are to be simulated by the fast fading simulating unit 200 and the path loss simulating unit 300.

In detail, the wired link tester 120 measures the attenuation and phase characteristics of a wired link corresponding to the DAC values with respect to all of the variable elements. A lookup table representing the DAC values for indicating desired attenuation and phase is written based on the measurement results. That is, the operation scenario is generated by applying the above-written lookup table to the channel scenario, which means the DAC values of the respective variable elements versus time, which are used to represent the attenuation and phase characteristics that are to be simulated by the fast fading simulating unit 200 and the path loss simulating unit 300.

Hereinafter, the functions of the respective elements of the control unit 600 will be described in detail with reference to FIG. 6A.

Referring to FIG. 6A, the controller 610 reads an operation scenario from the external computer 140 and stores the DAC values depending on the state change time and the number of state changes in the memory 630 through the FPGA 620. At this point, the controller 310 stores the state change time and the number of the state changes of the variable elements, which are written in the operation scenario, in the memory of the FPGA 620.

Because the specific portion of the operation scenario are the DAC value of the specific variable element, reading the operation scenario and storing the read operation scenario in the memory 630 mean storing the corresponding data in the corresponding memory corresponding to the specific variable element. To this end, the controller 610 controls the FPGA 620 such that each portion of the operation scenario is stored in the corresponding memory 630.

Also, the controller 610 commands the start and stop for the use of the wired link tester 120.

Upon receipt of the start command from the controller 610, the FPGA 620 transmits the DAC values of the variable elements, which are stored in the memory 630, to the fast fading simulating unit 200 or the path loss simulating unit 300, i.e., the DAC and RC filer 213 or 322, to control the fast fading simulating unit 200 and the path loss simulating unit 300, so that the attenuation and phase characteristics of the wired link tester 120 are identical to the attenuation and phase characteristics of a wireless channel that is to be simulated.

The memory 630 stores the DAC values versus time of the respective variable elements. That is, the memory 630 includes a total of 72 memory units for storing the DAC values of the respective variable elements, corresponding to a total of 72 variable elements of the wired link tester 120 including the fast fading simulating unit 200 and the path loss simulating unit 300.

Figure 7A:
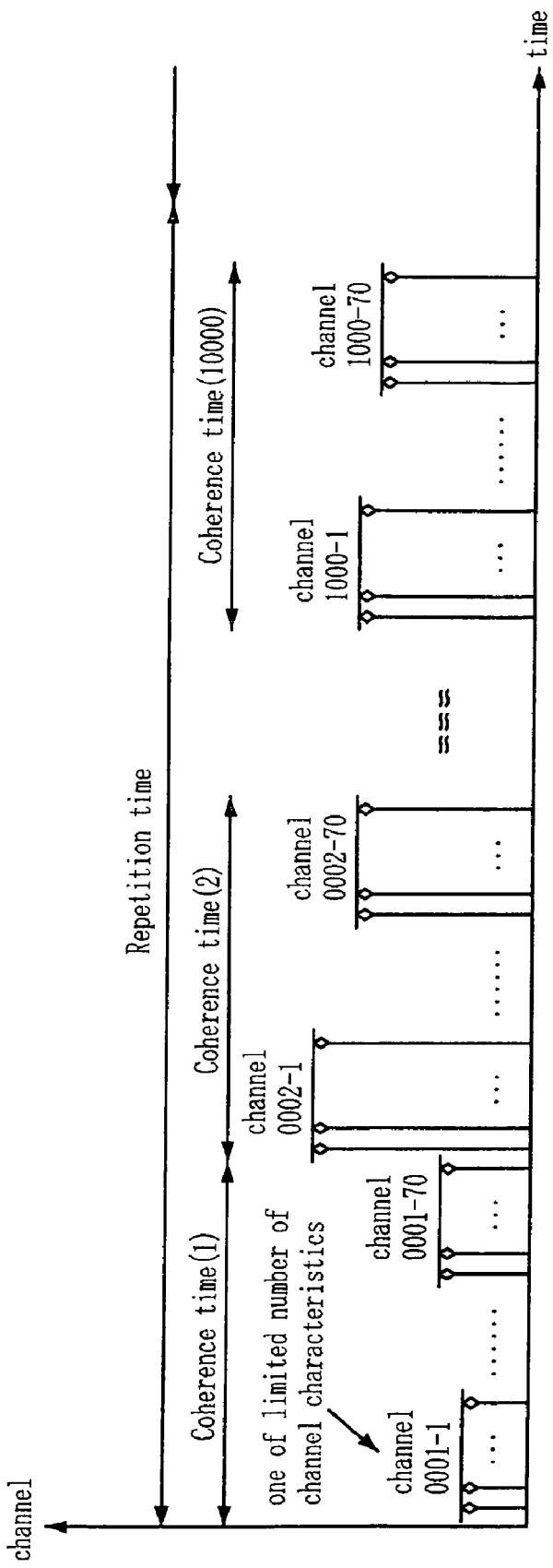
FIG. 7A is a diagram illustrating fast-fading characteristics to be simulated by a wired link tester, in accordance with an embodiment of the present invention.
Figure 7B:
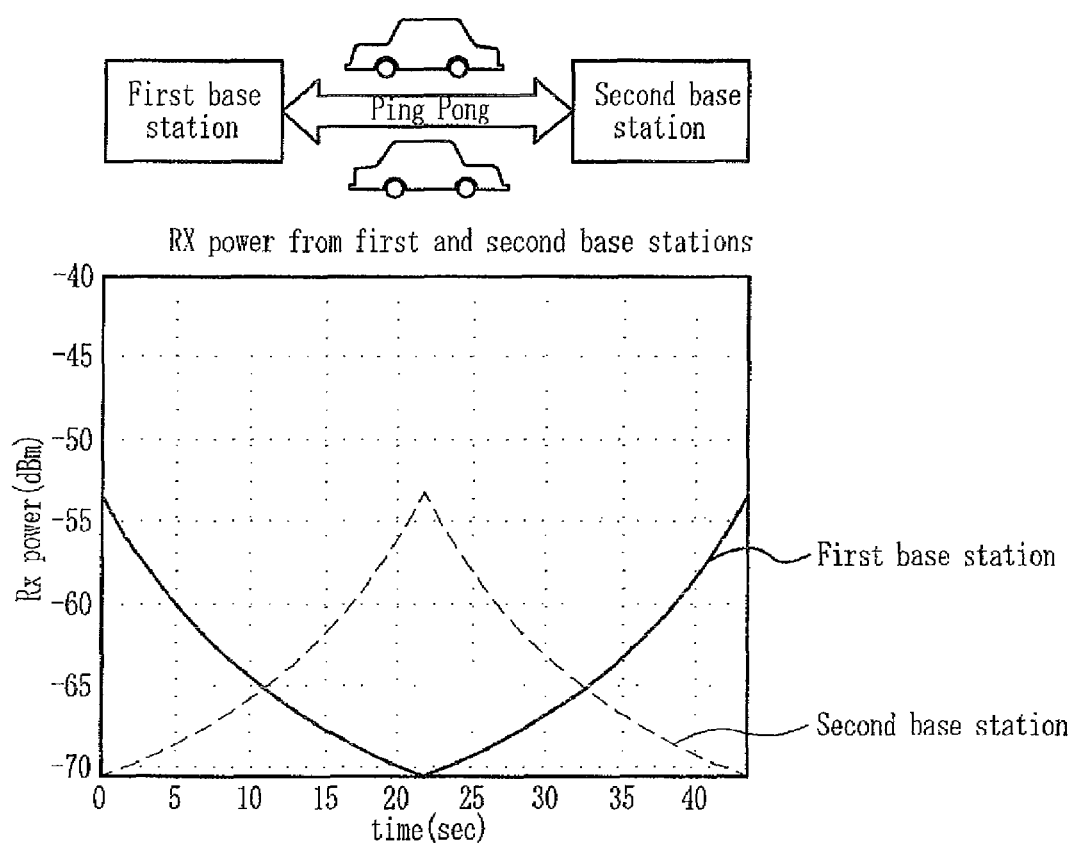
FIG. 7B is a diagram illustrating path-loss characteristics to be simulated by the wired link tester, in accordance with an embodiment of the present invention.

FIG. 7A is a diagram illustrating fast-fading characteristics to be simulated by the wired link tester 120, in accordance with an embodiment of the present invention. FIG. 7B is a diagram illustrating path-loss characteristics to be simulated by the wired link tester 120, in accordance with an embodiment of the present invention.

Referring to FIG. 7A, the state change time is '(state change time)=(coherence time)/70' and the number of the state change is 700,000. Herein, the coherence time means '½×(maximum Doppler frequency)'.

When the fast-fading characteristics illustrated in FIG. 7A are simulated by the wired link tester 120, the real-time automatic gain control function of the user terminal 130 can be checked by operating the first base station 111 or the second base station 112 and user terminal 130 under this condition.

Also, when the path-loss characteristics illustrated in FIG. 7B are simulated by the wired link tester 120, the handover function can be checked by operating the two base stations, i.e., the first base station 111 and the second base station 112, and the user terminal 130 under this condition.

Herein, the fast-fading characteristics illustrated in FIG. 7A and the path-loss characteristics illustrated in FIG. 7B represent the characteristics of one of wireless links constituting a wireless channel.

As described above, the wired link tester 120 can simulate any wireless channel that has no frequency selectivity. Thus, the system performance can be checked indoors prior to an outdoor experiment by suitably selecting a wireless channel to be simulated by the wired link tester 120 and then operating the base stations 111 and 112 and the user terminal 120 (see FIGS. 7A and 7B).

As described above, the present invention constructs a wired link corresponding to a wireless link for a MIMO system, thereby making it possible to simulate the situation where a signal transmitted from one transmitting antenna is received at all the receiving antennas.

Also, the present invention controls a variable element located on each wired link according to wireless-link characteristics that are to be simulated, so that the attenuation and phase characteristics of each wired link are identical to those of each wireless link.

Thus, the present invention can simulate any wireless channel that has no frequency selectivity, and has the following effects depending on wireless-channel characteristics that are to be simulated.

First, the present invention can test a simple system operation by simulating a wireless channel in which the path loss of the wired link tester is fixed, the fast fading has no time-selectivity and frequency-selectivity characteristics, and column vectors of a channel matrix are orthogonal to each other.

Second, the present invention can test a real-time automatic gain control function by simulating a wireless channel in which the path loss of the wired link tester is fixed, and the fast fading has only time-selectivity characteristics.

Third, the present invention can test a handover function by simulating a wireless channel in which the path loss of the wired link tester is time-variable, and the fast fading has only time-selectivity characteristics.

Also, the present invention requires a simpler structure and lower costs than the conventional channel simulator.

While the present invention has been described with respect to the specific embodiments, it will be apparent to those skilled in the art that various changes and modifications may be made without departing from the spirit and scope of the invention as defined in the following claims.

What is claimed is:

1. A wired link tester apparatus, comprising:
   a simulating unit for constructing a wired link corresponding to a wireless link for a multiple-input multiple-output system and simulating wireless-link characteristics using each variable element located on the wired link;
   wherein the simulating unit includes:
   a path loss simulator for simulating the path-loss characteristics of a Radio Frequency (RF) signal of each transmitting antenna by disposing a first variable element on the wired link; and
   a fast fading simulator for simulating fast-fading characteristics by constructing a wired link such that an RF signal of each transmitting antenna is received at all the receiving antennas, and disposing a second variable element on the wired link;
   wherein the first variable element includes a first variable attenuator and the second variable element includes a second variable attenuator and a variable phase shifter; and
   a control unit for prestoring a predetermined value of each variable element depending on a state change time and a number of state changes and controlling each variable element according to the predetermined value of each variable element.

2. The wired link tester apparatus of claim 1, wherein the wireless-link characteristics include path-loss characteristics and fast-fading characteristics.

3. The wired link tester apparatus of claim 1, wherein the predetermined value of each variable element is a Digital-to-Analog Converter (DAC) value of each variable element that the wired link uses to represent the attenuation and phase characteristics of the wireless link.

4. The wired link tester apparatus of claim 1, wherein the path loss simulator includes an uplink/downlink path loss compensator for compensating an uplink attenuation using a circulator and a fixed attenuator such that the same attenuation is applied to the uplink and the downlink.

5. The wired link tester apparatus of claim 4, wherein the uplink/downlink path loss compensator transfers an RF signal from a first base station and a second base station to a user terminal and transfers a signal from the user terminal to the first base station and the second base station.

6. The wired link tester apparatus of claim 1, wherein the control unit stores the predetermined value of each variable element, which is generated by applying a lookup table written from the results of measuring the attenuation and phase characteristics of the wired link corresponding to a DAC value with respect to all variable elements to the wireless-link characteristics to be simulated, and controls each variable element accordingly.

* * * * *